United States Patent [19]
Ritums et al.

[11] 3,805,385
[45] Apr. 23, 1974

[54] HOUSING FOR A PORTABLE GRASS SHEAR

[75] Inventors: Mikelis Ritums, Lake Geneva, Wis.;
Alvin Romin, Jr., Oak Lawn, Ill.

[73] Assignee: Sunbeam Corporation, Chicago, Ill.

[22] Filed: Oct. 11, 1972

[21] Appl. No.: 296,740

[52] U.S. Cl.................. 30/220, 30/DIG. 1, 56/17.6
[51] Int. Cl............................................ B26b 19/12
[58] Field of Search ............ 30/218, 220, 221, 222, 30/223, 228, DIG. 1, 231, 276, DIG. 5; 310/47, 50, 89; 56/2, 11.9, 16.7, 17.6, DIG. 18, 17.1, 17.2, 17.5

[56] References Cited
UNITED STATES PATENTS

| | | | |
|---|---|---|---|
| 942,490 | 12/1909 | Dunn | 56/DIG. 18 |
| 2,629,220 | 2/1953 | Grieder | 30/228 X |
| 3,077,664 | 2/1963 | Murawski | 30/228 X |
| 3,623,223 | 11/1971 | Edgell | 30/220 |
| 3,631,596 | 1/1972 | Glaus | 30/228 |
| 3,671,699 | 6/1972 | Matthews | 310/50 X |
| 3,699,655 | 10/1972 | Taylor | 30/216 |

*Primary Examiner*—Al Lawrence Smith
*Assistant Examiner*—J. C. Peters
*Attorney, Agent, or Firm*—George R. Clark; Neil M. Rose; John S. Pacocha

[57] ABSTRACT

A grass shear for trimming lawns is provided with a housing which supports and secures the internal components to facilitate and reduce manufacturing costs. The housing further provides for easy modification of the grass shear from a hand-held unit to one which is provided with a supporting wheel assembly and/or an extension handle to enable the operator to use and control the grass shear from an upstanding position. The housing is formed of two mating halves, each of which has a number of projections which serve to retain the various components of the grass shear without requiring any further fastening means. The housing is further provided with an extension handle receiving cavity; an extension handle carrying extension controls is removably securable within the receiving cavity. The mating halves of the housing have corresponding sections of reduced thickness and internal bearing support members providing for the addition of an axle and wheel assembly.

8 Claims, 7 Drawing Figures

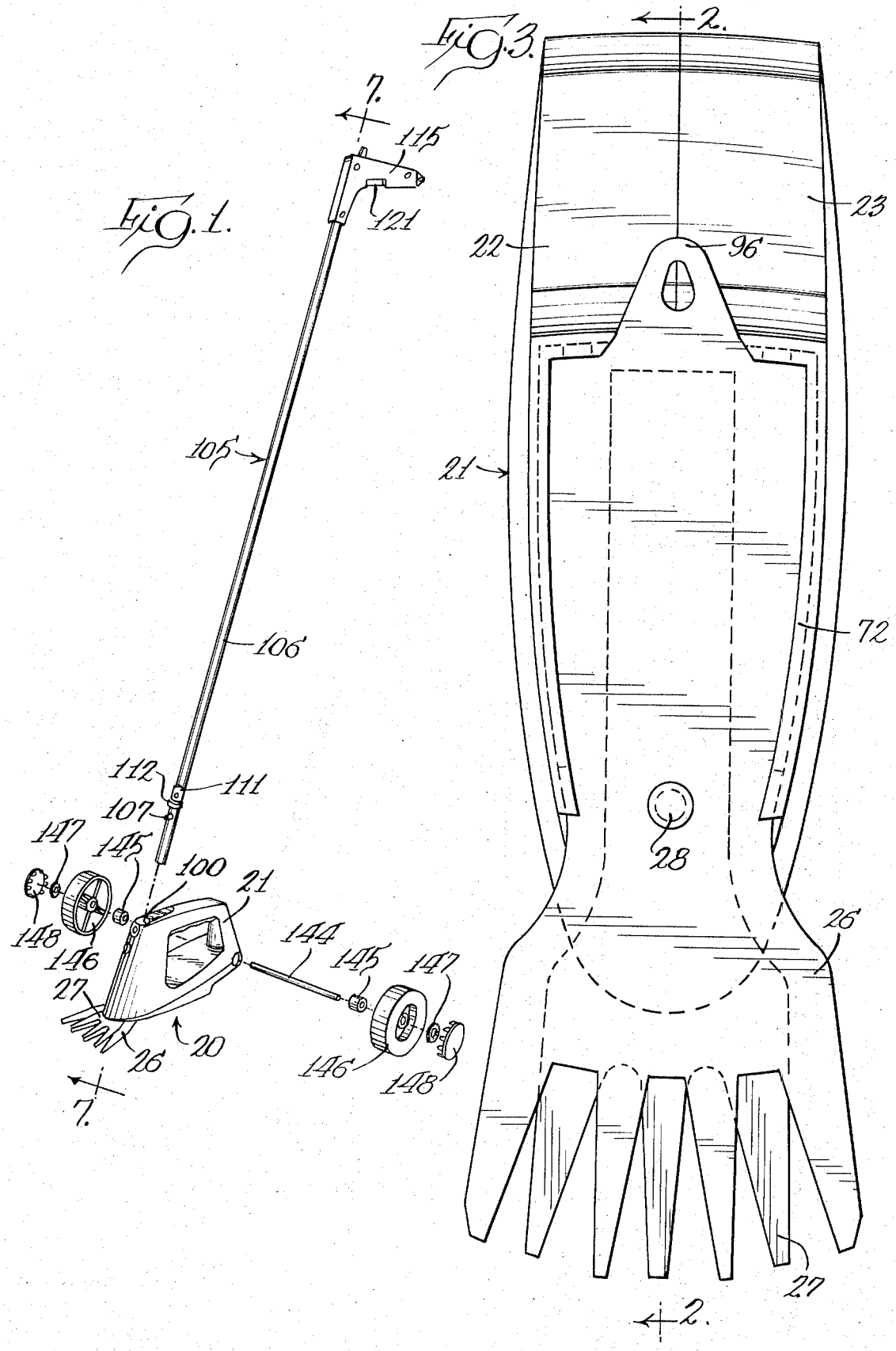

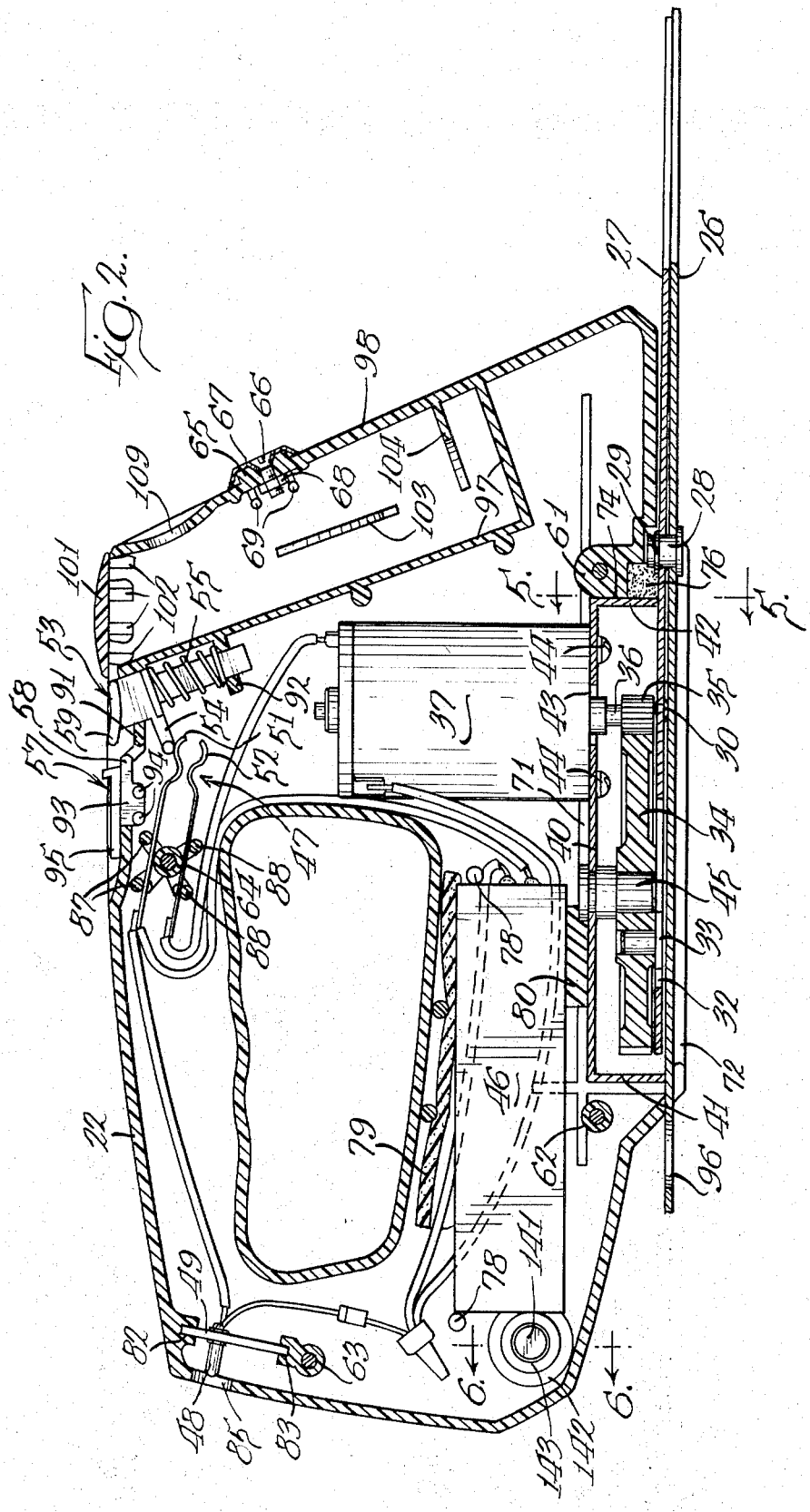

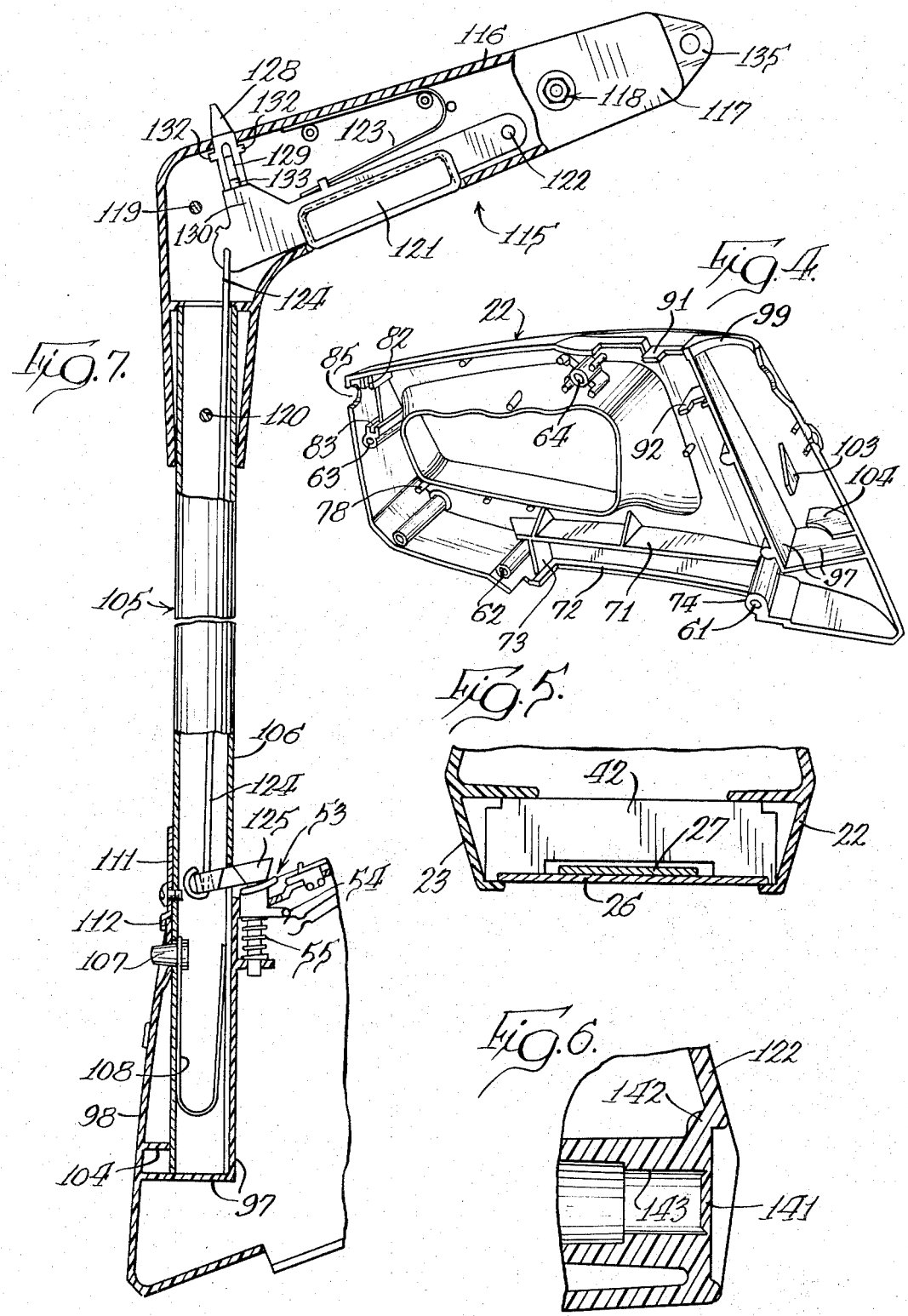

HOUSING FOR A PORTABLE GRASS SHEAR

BACKGROUND OF THE INVENTION

Trimming the edges of lawns adjacent walkways, flower beds and the like, although a tedious and time-consuming chore, is required to maintain a well-kept appearance. Although there are a large number of devices presently available for accomplishing this chore, ranging from manually powered scissor-like clippers to large gasoline-powered rotary blade trimmers, all of these devices are lacking in versatility. More recently, battery-powered, oscillating blade grass shears have become popular. This type of shear is available in both hand-held models which require the user to stoop over or kneel down to trim certain areas or in models provided with wheels for rolling the unit along the ground and long handles to permit operation from a standing position. There are times, however, when one or the other, that is the hand-held or the upright model, is more convenient for a particular trimming job. Although the user could, of course, purchase one of each of such models, it would be desirable to have a grass shear which is readily changeable from a hand-held to an upright model and back again to a hand-held model.

In the grass shears of the oscillating blade type presently on the market, the cutting is performed by an upper, movably mounted cutter blade cooperating with a lower stationary comb blade. This lower stationary comb blade also serves as a closure member for the mechanism contained in the housing. The housing is usually formed of two mating halves secured together by screws or the like. The lower stationary comb blade is then secured to the housing by means of additional fasteners such as screws. In order to facilitate assembly and provide for economy of manufacture, it would be desirable to have the stationary comb blade as well as other of the components secured to the housing without requiring any additional screws or the like.

SUMMARY OF THE INVENTION

The present invention is concerned with a housing for a portable grass shear formed to two mating halves fastened together by screws or the like which secures the various internal components and a bottom closure member without the need of any fasteners. The housing additionally provides for ready modification of the basic hand-held model to one which may be both operated and controlled to trim at ground level from a standing position and further provides for modifying the unit by the addition of an axle and wheel assembly for rolling the grass shear along the ground. The mating halves of the housing are provided with a number of integral internal projections which cooperate to retain the various components and also serve to form an extension handle receiving cavity. An extension handle having extension controls cooperates with the basic hand-held unit to permit the user to remain in an upright position while trimming at ground level. The housing halves are further provided with portions of reduced wall thickness and internal bearing support members permitting the ready addition of an axle and wheel assembly.

Accordingly, it is an object of the present invention to provide a housing for a grass shear formed of mating halves secured together by screws or the like which retain the various components including a bottom closure member without the need of any other screws or the like.

It is a further object of the present invention to provide a housing for a hand-held grass shear which permits the ready addition of an extension handle and control means to permit operation and control of the grass shear at ground level from a standing position.

It is another object of the present invention to provide a housing for a grass shear to which an axle and wheel assembly can be easily added if desired.

BRIEF DESCRIPTION OF THE DRAWINGS

For a better understanding of the present invention, reference may be had to the accompanying drawings in which:

FIG. 1 is an exploded perspective view of a grass shear with the extension handle and wheel assembly embodying the present invention;

FIG. 2 is a sectional view of the grass shear taken substantially along the line 2—2 of FIG. 3;

FIG. 3 is a bottom plan view of the grass shear;

FIG. 4 is a perspective view of the housing half shown in FIG. 2;

FIG. 5 is a fragmentary sectional view taken substantially along the line 5—5 of FIG. 2;

FIG. 6 is a fragmentary sectional view of the housing half taken substantially along the line 6—6 of FIG. 2; and FIG. 7 is a fragmentary sectional view of the extension handle and housing taken substantially along the line 7—7 of FIG. 1.

DESCRIPTION OF THE PREFERRED EMBODIMENT

Referring now to the drawings in which like parts are designated by like reference numerals in the various views, there is illustrated in FIG. 1 a hand-held grass shear generally designated by the reference numeral 20. The housing 21 of the hand-held grass shear is formed of two mating halves 22 and 23.

The grass shear has a lower stationary comb blade 26 and an upper movable cutter blade 27. The upper and lower blades are pivotally secured to each other by means of pivot pin 28 and snap ring 29. The upper blade 27 is formed with a slight bow such that its ends turn downwardly toward the lower blade 26 to provide for good cutting contact at the forward end. To reduce the possibility of friction between the upper and lower blades at the end opposite the forward cutting end, the upper blade 27 is provided with a thrust button 30 of low friction material such as Nylatron plastic.

The upper blade 27 is driven in an oscillatory manner about the pivot pin 28 in a conventional manner. The upper blade is provided with a slot 32 in the longitudinal direction of the blade. A guide block 33 carried by the rotating gear 34 rides in the slot 32 to oscillate the blade 27 about pin 28. The gear 34 engages pinion 35 which is secured to the drive shaft 36 of a motor 37 of suitable design.

In order to permit subassembly of the motor and gear train, there is provided a mounting plate 40 having rear down-turned edges 41 and a forward downturned edge 42. The motor 37 is mounted on the plate 40 by means of rivets or screws with the motor drive shaft 36 extending through the aperture 43 by means of rivets or screws 44. Secured to the mounting plate is a downwardly projecting stub shaft 45 for the rotating gear 34.

As shown in FIG. 2, the motor 37 is connected by suitable leads to a rechargeable battery power source 46 and to an on/off switch 47. The battery and switch are connected by other leads to terminal pins 48 secured to terminal board 49. Pins 48 are adapted to be connected to a separate battery recharging means not shown in the drawings. Alternatively, an A.C. motor could be used. Suitable leads would then connect the motor, through the switch 47, to a power cord.

The on/off switch assembly 47 comprises a pair of switch blades 51 and 52. For actuating the switch, there is provided a depressible switch actuator 53 which has a projecting arm 54 that engages switch blade 51. When the actuator 53 is depressed, arm 54 moves the switch blade 51 down into contact with switch blade 52 to energize the motor 37. The switch actuator 53 is biased upwardly by means of spring 55 such that immediately upon the removal of any pressure from the actuator 53 the switch blade 51 is allowed to return to its normal position out of engagement with switch blade 52 to immediately deenergize the motor. A slidable switch lock 57 is provided as a safety device. As shown in FIG. 2, a switch lock 57 is in its rearward position permitting switch acutator 53 to be depressed to energize the motor. When the lock 57 is moved to its forward locking position, the projecting finger 58 is interposed below the ledge 59 of switch acutator 53, thereby preventing any downward movement of the actuator 53.

The mating housing halves 22 and 23 are formed with a number of inwardly projecting apertured boss members 61, 62, 63 and 64. These boss members are adapted to receive screws (not shown) for the purpose of securing the two mating halves together. On each of the edges of the housing halves' forward wall there is a semicircular aperture surrounded by a semicircular raised ridge 65. When the halves are assembled, a bolt 66 with a conical washer 67 is inserted through the aperture and threadedly engaged with a nut 68 which is trapped by means of projections 69 on the housing half 22. The conical washer 67 surrounds the ridges 65 to further secure the assembled halves.

Each of the housing halves has an internal horizontal wall portion 71 and a lower inwardly projecting ledge 72. The wall portion 71 and the ledge 72, in addition to providing a more rigid housing member, trap and retain the mounting plate 40 and the lower blade 26. Each of the housing halves also has an internal vertical wall portion 73 which in combination with the edge 74 of boss 61 prevents lateral movement of the mounting plate 40 by engaging the downturned edges 41 and 42, respectively. As is best shown in FIG. 2, the downturned forward edge 42 is so formed as to provide clearance for the upper movable blade 27. A pad 76 of felt or some other suitable material is trapped by the housing between downturned edge 42 and the pivot pin assembly 28 to protect against the entrance of dirt, grass clippings or other debris into the housing. Thus the additional fastening means required by prior art devices for securing the lower blade to the assembled housing halves are eliminated.

In order to secure the rechargeable battery 46 within the housing there are provided projecting retaining pins 78 which prevent movement of the batteries in the longitudinal direction. Pads 79 and 80 secured to the housing above and below the battery 47, respectively, further serve to prevent movement of the battery.

The rearward portion of the uppermost wall of each of the housing halves is provided with a downturned slot forming rib 82, and each of the bosses 63 are provided with an upturned slot portion 83. These slots receive and secure the terminal board 49. The mating housing halves form an aperture 85 providing access for connecting the plug of the recharging means to the terminal pins 48.

On housing half 22, boss 64 is surrounded by projecting pin portions 87 and 88 which cooperate with boss 64 to trap and retain the switch blades. Thus, as is shown, in FIG. 2, the upper blade 51 is trapped between projections 87 and boss 64 while the lower blade 52 is trapped between projections 88 and the boss 64. The actuator 53 fits into slots formed in the depressed portion 91 of the uppermost wall of the housing and a slot in the inwardly angling ledge 92. Spring 55 bears against the portion of switch actuator 53 forming the projecting arm 54 and the ledge 92. In addition to biasing the switch for operational purposes, spring 55 serves to temporarily retain the switch actuator as a subassembly with housing half 22 until the two halves are secured to more permanently trap the actuator assembly.

The slidable switch lock 57 has a downwardly extending vertical portion 93 which fits into a slot in housing half 22. On either side of the lower part of the portion 93 are a pair of horizontally extending pins 94. As is shown in FIG. 2, the pins 94 are immediately below the inside surface of the uppermost wall of the housing. Thus, while switch lock 57 may slide in forward and rearward directions, vertical movement of the switch lock is prevented by means of the pins 94 and the top portion of the lock 95 which is wider than the vertical portion and the corresponding slot in housing half 22.

Thus, it will be appreciated by those skilled in the art that the entire mechanism for the grass shear may be subassembled in housing half 22 without requiring the use of any screws, bolts or rivets for retaining the components within the housing half. Further, it will be appreciated that upon securing the other housing half which has corresponding and mating projections to those described with respect to housing half 22, all of the components will be permanently trapped and retained by means of the four screws which are readily secured into apertured bosses 61, 62, 63 and 64.

To facilitate storing the grass shear, the lower blade is provided with an extending aperatured tab portion 96 opposite the cutting end for hanging the shear on a hook or the like.

In addition to providing means for securing the various components of the hand-held model, the structure of the housing halves also provides a cavity for removably receiving an extension handle with extension control means. Internal wall member 97 cooperating with the front wall 98 of the housing forms a cavity for receiving an extension handle. The forward end of the uppermost wall of each of the housing halves immediately above said cavity is formed with a semicircular segment 99 such that upon assembly of the two halves 22 and 23 an aperture 100 slightly larger than the diameter of the extension handle is formed. When used as a hand-held model, this opening may be covered by means of cap 101 having resilient fingers 102 which engage the edges of the housing forming the opening. Within the cavity for receiving the extension handle, each of the housing halves is provided with a substantially vertical rib 103 and a substantially horizontally extending rib 104. The rib 103 angles inwardly from its uppermost portion and serves to guide the extension handle to a centered position when it is inserted into the cavity. The inwardly projecting end of the rib 104, as best shown in FIG. 7, is formed with a circular notch and serves to trap the extension handle when it is inserted to prevent pivoting of the extension handle about the edge of the housing forming the opening 100. The previously described means for securing the housing halves together comprising in part bolt 66, conical washer 67 and nut 68 in an obstruction-free structure facilitating the insertion of the extension handle.

The extension handle 105 is formed of a tubular member 106 of suitable length. Button 107 extends through the tubular member and is biased outwardly by means of U-shaped leaf spring 108. Upon inserting the extension handle into the grass shear housing, the button 107 is manually depressed. When the handle is properly seated abutting the bottom wall formed by internal wall member 97, the biasing force of spring 108 pushes the button through the aperture 109 in the front wall of the assembled housing, thereby preventing removal of the handle unless the button 107 is manually depressed to permit withdrawal of the extension handle 105. To further secure the extension handle to the housing, the tubular member 106 is provided with a bracket 111 having a lip 112 which is shaped such that it fits around the upper part of the front wall of the housing. Thus, as best shown in FIG. 7, the bracket lip 112 and the adjacent portion of the tubular member 106 form a slot trapping part of the front wall of the housing 20.

Secured to the upper part of tubular member 106 is a hand-gripping portion 115. The hand-gripping portion 115 is formed of two mating halves 116 and 117. The two halves are secured together by means of nut and bolt assembly 118 and similar assemblies (not shown) which pass through the apertures 119 and 120. In addition to securing the two halves together, the nut and bolt assembly which passes through the aperature 120 also serves to secure the hand-gripping portion 115 to the tubular member 106.

The extension handle is provided with a trigger 121 which is pivotally mounted between the hand grip halves 116 and 117 by pins 122 on the trigger that fit into inwardly extending apertured bosses on the halves 116 and 117. The trigger is biased downwardly by means of U-shaped spring 123 as shown in FIG. 7. Secured to the free end of the trigger 121 is control rod 124. Attached to the opposite end of control rod 124 is a control arm 125 which extends through tubular member 106 and abuts the pushbutton actuator 53 when the extension handle 105 is inserted into the housing 20. Hence, when using the grass shear with the extension handle, the operator need only squeeze the trigger 121, thereby raising the control rod 124 which causes the free end of control arm 125 to pivot downwardly, depressing pushbutton 53 to energize the device as has been previously described.

Hand grip 115 is further provided with its own trigger locking means which obviates the need to use the slidable switch lock 57 when the grass shear is used with the extension handle. The trigger locking means comprises a rotatable knob 128 having a slot 129. The slot 129 is slightly wider than the thickness of the forward portion 130 of the trigger 121. Horizontally projecting ears 132 on the knob prevent it from moving vertically out of the hand-gripping portion 115. In FIG. 7 the knob 128 is shown in its trigger locking position. Inasmuch as the lower portion of the knob abuts the trigger and the knob cannot be moved outwardly, the trigger cannot be pivoted. However, when the knob 128 is rotated 90°, the slot 129 is aligned with the forward portion 130 of the trigger, and when the trigger is squeezed it may be pivoted with the forward portion 130 moving upwardly into the slot 129. The forward portion 130 of the trigger is provided with an upwardly extending portion 133 that is narrower and fits into the slot 129. The extending portion 133 serves to center the knob 128 when it is rotated.

The free end of the hand grip 115 is provided with an apertured tab 135 to provide means to hand the extension handle, either by itself or attached to the grass shear, upon a hook or the like when not in use.

Although the grass shear, even with the extension handle, may be conveniently used without any supporting wheels, a support wheel structure is desired by a number of users. Accordingly, the grass shear housing of the instant invention is provided with means facilitating the addition of an axle and wheel assembly. As is best shown in FIG. 6, the housing is provided with a section 141 having a substantially reduced wall thickness. This section of substantially reduced wall thickness can be easily punctured or ruptured by the insertion of an axle. In order to provide sufficient support for mounting an axle, the housing is provided with a substantially cylindrical inner strengthening rim 142 and an inwardly extending cylindrical wall 143 which provides a length of bearing and supporting surface for the axle. The wall 143 may be made of sufficient length such that upon assembly of the mating halves, the respective cylindrical wall portions abut thereby supporting substantially the entire length of the axle. The wheel assembly comprises an axle 144, a pair of spacers 145, a pair of wheels 146, a pair of cap nuts 147 and a pair of hub caps 148, the assembly of which is shown exploded in FIG. 1.

While a particular embodiment of the present invention has been illustrated and described, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A housing for a hand-held, portable, electrically driven grass cutting device having means for receiving an extension handle and an extension handle for said device, said housing being formed of mating halves, portions of each of said halves cooperating to define an extension handle receiving cavity, and fastening means to secure said portions together without obstructing said cavity, an exposed, manually actuable on/off switch mounted on said housing for controlling the energization of said device, an opening for said cavity adjacent said manually actuable switch for receiving said extension handle, an aperture in a wall of the housing forming said cavity, said extension handle having an insertable end and a gripping end, biased pin means on said insertable end, said pin means cooperating with said aperture for retaining said extension handle in said cavity, extension control means including a control rod carried by said handle, said control means being manually actuable at said gripping end and cooperating with said switch for remotely controlling the energization of the device.

2. The housing of claim 1 wherein portions of said housing defining said cavity have inwardly projecting ribs for guiding said insertable end into and supporting said insertable end within said cavity.

3. The housing of claim 1 wherein said fastening means secure said portions where they mate, said fastening means comprising a nut, bolt, and conical washer.

4. In the combination of claim 1, said extension handle comprising a tubular member, said control rod being carried within said tubular member.

5. A housing for a hand-held, portable, electrically driven grass cutting device having means for receiving an extension handle and an extension handle for said device, said housing defining an extension handle receiving cavity, an exposed, manually actuable on/off switch mounted on said housing for controlling the energization of said device, an opening for said cavity adjacent said manually actuable switch for receiving said extension handle, an aperture in a wall of the housing forming said cavity, said extension handle having an insertable end and a gripping end, biased pin means on said insertable end, said pin means cooperating with said aperture for retaining said extension handle in said cavity, said extension handle is provided with an externally mounted bracket member, said bracket member being positioned a preselected distance from the insertable end of the extension handle, said bracket having an outwardly and downwardly extending lip portion, the internal surface of said lip portion conforming in shape to the outer shape of a portion of the housing wall defining said cavity adjacent said opening whereby said lip engages said portion of said housing further securing said extension handle to said housing, extension control means including a control rod carried by said handle, said control means being manually actuable at said gripping end and cooperating with said switch for remotely controlling the energization of the device.

6. A housing for a hand-held, portable, electrically driven grass cutting device having means for receiving an extension handle and an extension handle for said device, said housing defining an extension handle receiving cavity, an exposed, manually actuable on/off switch mounted on said housing for controlling the energization of said device, an opening for said cavity adjacent said manually actuable switch for receiving said extension handle, an aperture in a wall of the housing forming said cavity, said extension handle having an insertable end and a gripping end, biased pin means on said insertable end, said pin means cooperating with said aperture for retaining said extension handle in said cavity, extension control means including a control rod carried by said handle, said control means being manually actuable at said gripping end and cooperating with said switch for remotely controlling the energization of the device, switch locking means carried by said housing, and trigger locking means carried by said extension handle to prevent energization of the device at said gripping end.

7. A housing for a hand-held portable, electrically driven grass cutting device having a pair of blades movable with respect to each other for cutting grass, an on/off switch assembly for controlling the energization of the device, an actuator for said switch assembly, said housing comprising a pair of mating housing halves, each of said halves having cooperating integral projections for supporting and securing said blades, said switch assembly and electrical driving elements, said mating halves forming a substantially vertical forward portion, and an upper substantially horizontal handle portion extending rearwardly from said vertical portion and spaced above said blades, portions of each of said mating halves defining a cavity for receiving an extension handle, said cavity being formed in said substantially vertical portion adjacent said switch actuator.

8. The housing of claim 7 wherein fastening means secure said portions of said mating halves together without obstructing said cavity.

* * * * *